No. 623,087. Patented Apr. 11, 1899.
W. W. KENFIELD.
GEARING.
(Application filed Mar. 11, 1899.)
(No Model.)

Witnesses
C. G. Crannell
N. E. Benjamin

Inventor
Wm. W. Kenfield,
By Geo. B. Selden,
Attorney

UNITED STATES PATENT OFFICE.

WILLIAM W. KENFIELD, OF ROCHESTER, NEW YORK, ASSIGNOR TO THE ROCHESTER CYCLE MANUFACTURING COMPANY, OF SAME PLACE.

GEARING.

SPECIFICATION forming part of Letters Patent No. 623,087, dated April 11, 1899.

Application filed March 11, 1899. Serial No. 708,650. (No model.)

*To all whom it may concern:*

Be it known that I, WILLIAM W. KENFIELD, a citizen of the United States, residing at Rochester, New York, have invented certain Improvements in Gearing, of which the following is a specification, reference being had to the accompanying drawings.

My invention relates to certain improvements in the construction of gearing designed more particularly for use on chainless bicycles, but capable of application in all kinds of machinery.

My improvements are fully described and illustrated in the following specification and the accompanying drawings, the novel features thereof being specified in the claims annexed to the said specification.

Figure 1:
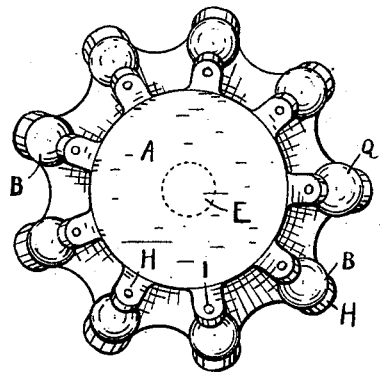
Figure 2:
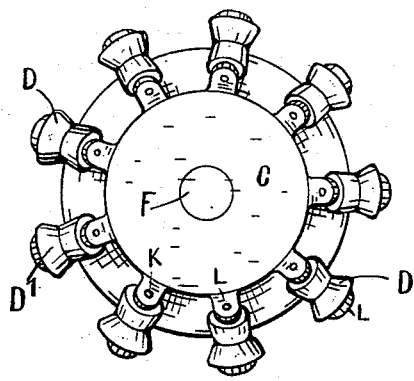
Figure 3:
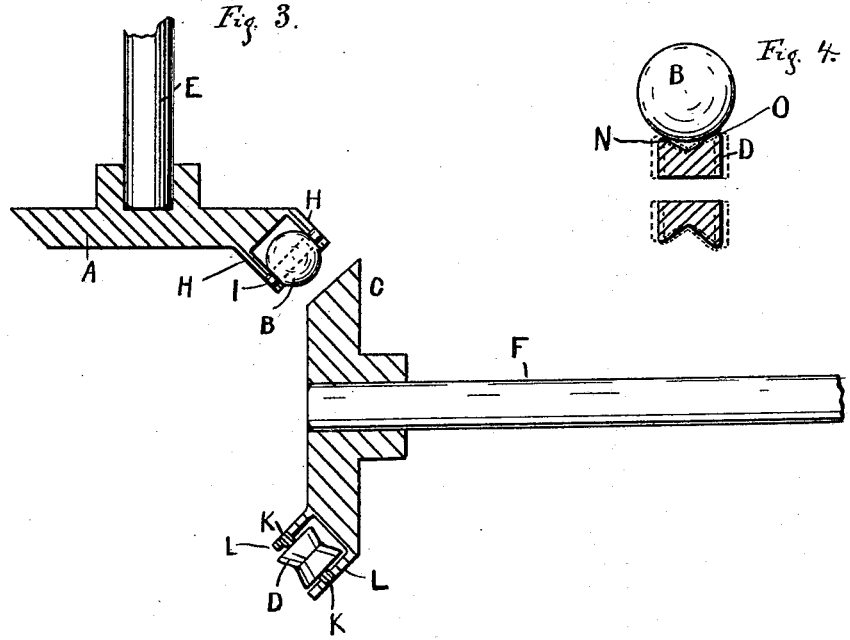
Figure 4:
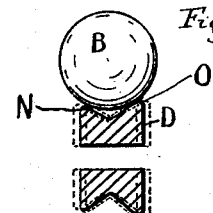

In the accompanying drawings, Figure 1 is an elevation of one rotary member of my improved gearing provided with balls. Fig. 2 is an elevation of the corresponding member provided with spools of double conical shape. Fig. 3 is a section through the axis of the two members. Fig. 4 is a diagram representing the relative action of the balls and spools.

In the construction of my improved gearing I employ one rotary disk or suitable member A, provided around its periphery with balls B, and the corresponding rotary member C, which is provided with the double conical spools D, arranged to coöperate with the balls B. The members or disks are supported by suitable shafts E and F, which may be arranged at any desired angles relatively to each other. The balls B are attached to the disk A by lugs H, one on each side, and pins I, passing through the lugs and the balls, which may be rigidly fixed or may revolve on the pins, as preferred. The disk A and its lugs may be made of one piece or of separable parts suitably secured together.

The disk or rotating member C carries a series of spools D, which are shaped like two cones, attached together at their smaller ends, and which engage with the balls by two points of contact, as represented most plainly in Fig. 4. The spools are supported by pins K, Fig. 3, inserted in lugs L on the disk C. I prefer to allow the spools to revolve; but they may be fixed rigidly to the disk. From the double conical shape of the spools, as shown in the diagram Fig. 4, it will be seen that they have two points of bearing on the balls N and O on opposite sides of the central line. This arrangement not only affords increased wearing-surface, but it also enables the spools, which have some capacity of lateral movement on the studs or pins K, to adjust themselves to the balls, so that any spring or yielding in the journals which support the shafts E and F is compensated for and no serious friction or binding is encountered. The lateral or lengthwise adjustment of the spools is indicated by the full and dotted lines in Fig. 4, from which it will be seen that if any yielding or variation in position occurs in either of the journals for the shafts E and F the lengthwise movement of the spool on its axis will compensate for it without excessive friction or binding. As the two disks with their balls and spools revolve they will adjust themselves to any variations in alinement of the axes of rotation, and it will of course be understood that the requisite compensation may be secured by allowing lateral adjustment in the balls instead of the spools. In the construction shown, in which my improved gearing is illustrated as applied to a chainless bicyle, the spools are the drivers; but obviously such arrangement may be reversed.

Fig. 1 represents the rotary member or disk in front elevation, with its balls, and Fig. 2 represents the corresponding rotary member or disk C, provided with its double conical spools or rollers. On examining the two figures it will be obvious that if the shaft of the disk C be shifted so as to bring it into a plane parallel to the paper the ball Q will fit in between the spools D D', and that I will then have a bevel-gear, either mitered or inclined, as may be required. The skilful constructor will also see that my invention may be used as a substitute for spur-gears. The balls B may revolve on the pins or the pins may be so shaped that they cannot revolve, and the same may be said about the spools. In the preferred construction, however, both the balls and spools are allowed to revolve, as tending in some degree to reduce friction.

The depth and shape of the groove in the spools may be varied in any way consistent with securing the two points of bearing, one on each side of the central line of the balls. Any suitable number of balls or spools may be employed on either rotary member.

My improved gearing runs smoothly and with very little friction, as I have demonstrated by practical trial extending over a considerable period of time.

I do not claim herein the combination of a gear-wheel having convex-surfaced roller-teeth with a gear-wheel having concave-surfaced roller-teeth, said convex rollers meshing with the concave rollers, as this is the subject-matter of a claim in my pending application, Serial No. 708,571, filed March 10, 1899.

I claim—

1. In ball-gearing, the combination of a rotary member provided with a series of balls arranged at equal distances apart around its periphery, with another rotary member provided with a corresponding series of spools smaller at their inner ends, and each spool having two points of contact with its coöperating ball, as and for the purposes set forth.

2. In ball-gearing, the combination of a rotary member provided with a series of balls arranged at equal distances apart upon its periphery, with another rotary member provided with a corresponding series of spools, each spool being free to slide laterally on its axis and having two points of contact with its coöperating ball, the inner point of contact having a shorter radius and being nearer the central line of the ball than the outer point, substantially as described.

WILLIAM W. KENFIELD.

Witnesses:
GEO. B. SELDEN,
C. G. CRANNELL.